United States Patent

[11] 3,600,803

[72] Inventor Zolman Nachsi
 613 Bedford Ave., Brooklyn, N.Y. 11211
[21] Appl No. 832,906
[22] Filed June 13, 1969
[45] Patented Aug. 24, 1971

[54] CORN AND NAIL CUTTER
 5 Claims, 7 Drawing Figs.
[52] U.S. Cl. .................................. 30/27, 132/75
[51] Int. Cl. .................................. A45d 29/00
[50] Field of Search.................................. 30/26, 27; 132/73, 74.5, 75, 75.3, 75.4, 79.1; 401/17, 37

[56] References Cited
UNITED STATES PATENTS
1,181,241  5/1916  Newman .................. 132/75.4

Primary Examiner—Othell M. Simpson
Assistant Examiner—Alan G. Goedde
Attorney—Polachek & Saulsbury ABSTRACT: A corn and nail cutter has been provided with a removable blade handle assembly and a handle that has a round head for the securement of the blade assembly thereto. The blade is already retained by the blade parts and assembly provides a self-contained unit for fixing the blade to the handle. The blade assembly and round head are so constructed that the blade assembly can be placed on the round head and retained rigidly in four different 90° angle positions to expose the blade edges either transversely or longitudinally of the handle. In the opposite end of the handle there is provided a slotted and elongated opening in which a liquid-treating device may be stored and which has a partial cover to close the slotted part of the opening of the handle when the device is thrust home into the handle opening. Protuberances and recesses are provided on the handle and the container to hold the same in the handle and also on the partial handle on the container to hold the same aligned with the container over the brush.

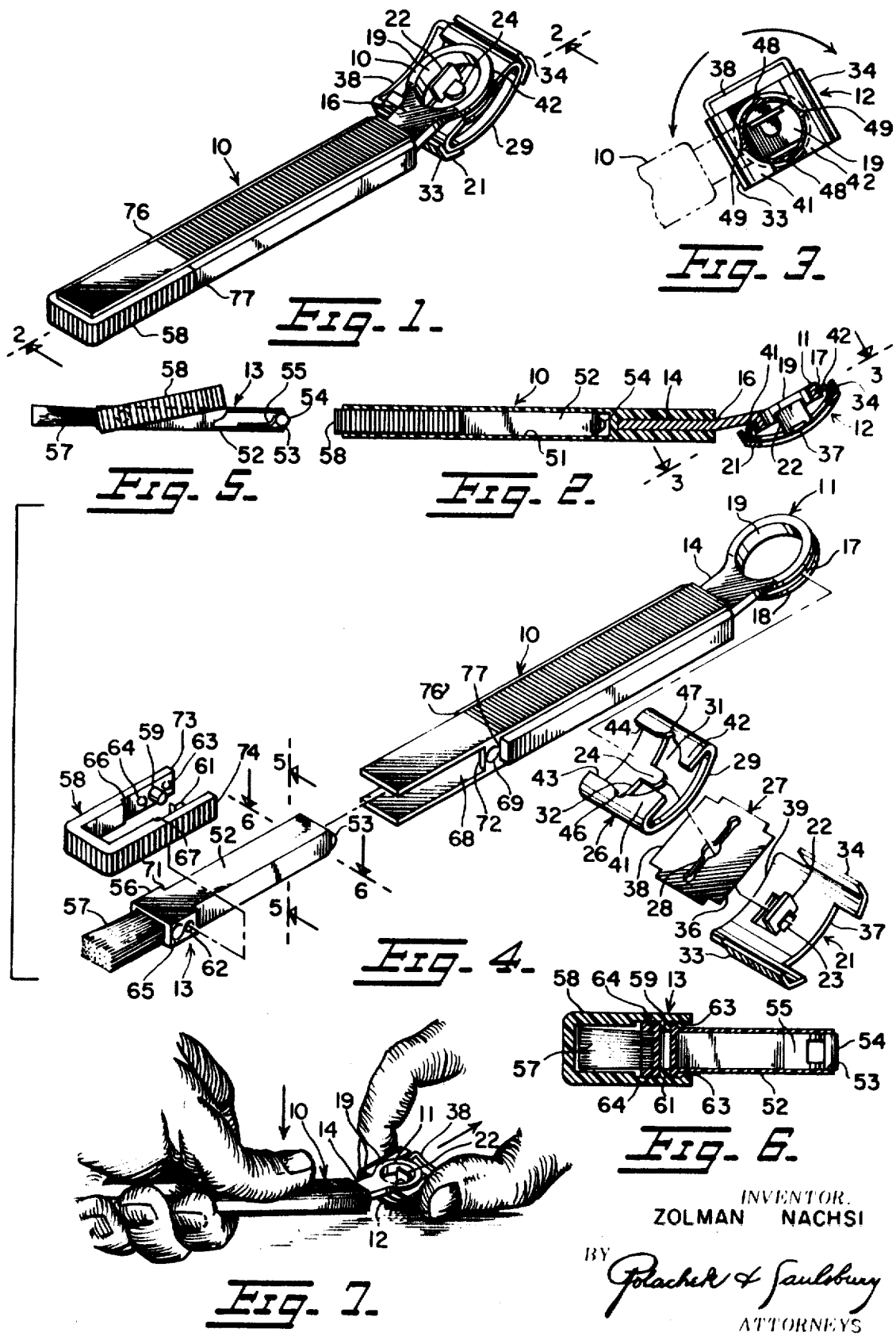

CORN AND NAIL CUTTER

This invention relates to a corn and nail cutter.

It is the principal object of the present invention to provide a corn and nail cutter in which a removable blade is carried between two parts and can be angled between a position extending transversely of the handle to adapt the cutter for cutting corns or callouses, or longitudinally of the handle to adapt the cutter for the cutting and trimming of toe-and-fingernails.

It is another object of the invention to provide a corn and nail cutter in which the blade edge can be extended either transversely or longitudinally of the handle without removing or disassembling the blade and its retaining parts.

It is a further object of the invention to provide in a removable blade corn-and-nail-cutting device an assemblage of retaining parts for the blade that can be handled as an assemblage to turn the assemblage upon the handle and on which there is provided finger, thumb-grasping portions to guard against the cutting of the thumb or finger while turning the blade between transversely and horizontally extending positions upon the handle.

It is a still further object of the invention to provide in a corn and nail cutter a liquid-treating assemblage adapted to be stored in the lower end of the handle in such a manner that a brush forming a part of the liquid-treating device will be covered by a partial cover provided upon the liquid-treating device in combination with the handle as the liquid-treating device is slid home into the handle end.

Other objects of the invention are to provide a corn-and-nail-cutting device, having the above objects in mind, which is of simple construction, durable and rigid in use, light in weight, of pleasing appearance, has a minimum number of parts, efficient and effective is use.

For a better understanding of the invention, reference may be had to the following detailed description taken in connection with the accompanying drawings, in which:

FIG. 1 is a top perspective view of the assembled corn and nail cutter employing the features of the present invention;

FIG. 2 is a longitudinal sectional view taken on line 2—2 of FIG. 1;

FIG. 3 is a transverse sectional view taken on line 3—3 of FIG. 2 and through the removable head assembly;

FIG. 4 is an exploded view of the handle and all of the parts but disassembled therefrom;

FIG. 5 is a longitudinal sectional view with portions broken away of a roll-on liquid-treating device which is removable from the handle, the portions being broken away on line 5—5 of FIG. 4;

FIG. 6 is a transverse sectional view of the liquid-treating device with its cover longitudinally aligned therewith and as viewed on line 6—6 of FIG. 4; and FIG. 7 is a perspective view of the corn and nail cutter with illustrations being made as to the manner that the blade assembly is removed from the handle head.

Referring now to the figures, 10 represents generally a handle having a round attaching head 11, a blade assembly 12 adapted for attachment to the round handle head 11 and a liquid-treating brush device 13 adapted to be inserted and stored in the rear end of the handle 10.

The handle 10 is formed of plastic and has a shank 14 of the round head 11 embedded at the end thereof and bent slightly at 16 to have the blade assembly 12 extend slightly to an angle from the handle and to position it for more convenient use in performing the chores for which this cutter is adapted.

The round head 11 is of full circular formation providing for a groove 17 that extends fully about the head and lying beneath the top of the head 11 between the top of the head and a drop flange 18. This round head has a central opening 19 concentric with the groove 17 and flange 18. This opening 19 accommodates parts of the removable blade assembly when attached to the head 11 as will be apparent with further description.

The removable blade assembly comprises an outer curved plate 21 having a projection 22 struck upwardly from the concave face of the plate 21 and in which at the root of the same, there is provided a slot 23 for accommodating a tong 24 of an attaching plate 26. A blade 27 having the usual slot 28 is placed upon the outer plate 21 so that the projection 22 extends upwardly through the slot 28 of the blade. The blade is bendable and can conform to the contour of the concave face of the plate 21. The attaching plate 26 is of the same contour as the plate 21 so that its concave face 29 will force the blade downwardly, opening 31 in the attaching plate 26 will receive the projection 22 and as the attaching plate 26 is slide upwardly to slide the tong 24 through the slot 23 in the upstanding projection 22 the attaching plate will secure the blade 27 in place between the two parts. Edge 32 of the slot 31 will abut the face of the projection 22 to conclude the assembly of the parts together and to ensure a good grip of the blade with the part.

While this function is being effected the thumb and fingers are protected by upwardly extending flanges 33 and 34 lying opposite sides of the plate 21 and over the ends of the blade. One blade edge 36 will overlie a recess cutaway portion 37 in the forward edge of the plate 21. The other edge 38 of the blade 27 will protrude from the other edge of the slot 31 of the plate 21 as best seen in FIGS. 1 and 2.

This assembly 12 is adapted to be placed upon the round head 11 and can be turned to any desired 90° position thereon. When the corns and callouses are being cut the assembly is adjusted to locate the blade edges so that they extend transversely of the handle and when the nails are to be cut the assembly will be adjusted so that the blade and edges extend longitudinally of the handle. For effecting the connection of the assembly with the round head 11 on the handle 10, the inner or blade retaining plate 26 has its opposite sides 41 and 42 folded inwardly and the cutaway respectively at 43 and 44 to receive the round head and locate the edges 43 and 44 in the groove 17. The edges 43 and 44 are rounded to accommodate the contour of the groove but are open at their rear ends to pass the diameter distance of the groove 17. The side edges 43 and 44 have notches 46 and 47 to accommodate and receive diametrically opposite projections 48 in the groove 17 as best seen in FIG. 3 so as to hold the blade assembly against rotation when disposed upon the round head 11 as shown in FIG. 3. Another pair of diametrically opposite projections 49 are disposed in the groove 17 90° apart from the projections 48 to hold the blade assembly by the location of this pair of projections 49 in the notches 46 and 47 as shown in FIG. 3 and so that the blade edges run longitudinally of the handle.

It should be apparent that the blade assembly 12 can be adjusted upon the round head 11 through 360° to expose the blade edges either from the recess 27 of the plate 21 or upon its projected end from the edge 39 of the plate 21 for the selected cutting purposes for which the blade is to be used.

It should be readily understood that the blade assembly can be easily snapped on to the head 11 of the handle, the inturned ends 41 and 42 biasing sufficiently to make the connection. The removal of the blade assembly from the handle head 11 does not release the blade and it is kept intact between the two plates 21 and 26 until these plates are disassembled to remove the blade.

In the handle 10 is an elongated opening 51 for accommodating the liquid-treating device 13 when it is not in use. This liquid-treating device 13 comprises an elongated stick container 52 having a dispensing opening 53 in which there is disposed a roller 54 that can be rolled over the skin to extract the liquid from the container and transfer it to the skin. The roller 54 is retained against inward displacement by an upturned backing strip 55 secured to one side of the retainer, on the other end of the container 52 is an enlargement 56 which is open and from which protrudes brush bristles 57 which can be used to further distribute the liquid transferred by the roller 54 over the skin.

In order to keep the brush bristles 57 from being exposed when the liquid container 52 is thrust into the opening 51 in the handle a partial cover member 58 of U-shape is pivotally connected by pivot pins 59 and 61 extending into openings 62 in the enlargement 56 of the container 52 so that when the liquid-treating device 13 is removed from the handle opening 51 it can be pivoted from the bristles to the position shown in FIG. 5. The U-shaped cover member 58 has on the inner faces of the leg portions thereof projections 63 and 64 which will register with depressions 65 on the sides of the container enlargement 56 to hold the partial cover 58 either in the position shown in FIG. 5 or in its elongated positions as shown in FIG. 6 when shoulders 66 and 67 will overlie the end face of the enlargement 56.

The handle opening 51 is slotted across the same and its outer end as shown at 68 to accommodate the enlargement 56 with its partial cover 58 when the liquid-treating device 13 is slid home into its opening 51. The projection 63 will lie in side openings 69 to hold the control device against axial outward displacement from the handle without force. The shoulder 71 will at this time register with end face 72 of the handle slot 68 and ends 73 and 74 of the leg portions of the partial cover member 58 to respectively abut shoulders 76 and 77 on the handle 10. Thus it can be seen that there can also be stored in the handle 10 the liquid-treating container bearing a brush which will be fully protected when disposed in the container. It will also be apparent that the partial cover 58 can be lowered back to the positions shown in FIG. 5 when the liquid-treating device is to be put to use.

What is claimed is:

1. A corn and nail cutter comprising a handle with a head extending therefrom, a removable cutter blade assembly containing a cutter blade, and said handle head and said blade assembly being so constructed as to allow the blade assembly to be connected to the head in four different positions to expose the cutting edges transversely and longitudinally of the handle, and said handle head being round in shape and provided with an external groove and said blade assembly comprising outer and inner parts between which the blade is assembled having one of the parts with inturned flanges and their edges cut away to be received in the external groove on the handle head.

2. A corn and nail cutter as defined in claim 1, said blade assembly including an outer part with an upstanding projection for receiving the shot of the blade, said projection having a slot in its lower end, a retainer part having a bottom recess and a tong extending into the recess and adapted to pass through the slot in the upstanding projection to hold the parts and blade in lock-clamp assembly.

3. A corn and nail cutter as defined in claim 2, and said retainer part having edges folded inwardly and opposing one another and providing the cutaway portions for the assembly of the blade assembly within the groove of the round head upon the handle.

4. A corn and nail cutter as defined in claim 3, and said outer blade assembly part having upstanding finger guard portions for the handling of the blade assembly and the adjustment of the same upon the handle head.

5. A corn and nail cutter is defined in claim 1, and said inturned flanges of the one of said blade assembly parts having respectively notches opposing each other, said cutter blade being diametrically slotted, said round head having diametrically aligned projections in the groove for accommodating the notches of the inturned flanges and the ends of the blade slot so as to thereby retain the blade assembly upon the head against rotational displacement from its cutting position.